US012673793B2

(12) United States Patent
Pasquetto

(10) Patent No.: US 12,673,793 B2
(45) Date of Patent: Jul. 7, 2026

(54) METHOD AND SYSTEM FOR MANUFACTURING A SHEET OF LAUNDRY DETERGENT

(71) Applicant: Massimiliano Pasquetto, Treviso (IT)

(72) Inventor: Massimiliano Pasquetto, Treviso (IT)

( * ) Notice: Subject to any disclaimer, the term of this patent is extended or adjusted under 35 U.S.C. 154(b) by 635 days.

(21) Appl. No.: 18/125,292

(22) Filed: Mar. 23, 2023

(65) Prior Publication Data

US 2024/0317436 A1 Sep. 26, 2024

(51) Int. Cl.

| | |
|---|---|
| ***C11D 1/12*** | (2006.01) |
| ***B65B 5/06*** | (2006.01) |
| ***B65B 11/52*** | (2006.01) |
| ***C11D 1/14*** | (2006.01) |
| ***C11D 1/72*** | (2006.01) |
| ***C11D 1/90*** | (2006.01) |
| ***C11D 1/94*** | (2006.01) |
| ***C11D 3/08*** | (2006.01) |
| ***C11D 3/20*** | (2006.01) |
| ***C11D 3/22*** | (2006.01) |
| ***C11D 3/37*** | (2006.01) |
| ***C11D 3/382*** | (2006.01) |
| ***C11D 3/50*** | (2006.01) |
| ***C11D 11/00*** | (2006.01) |
| *C11D 1/66* | (2006.01) |

(52) U.S. Cl.

CPC ................ *B65B 5/06* (2013.01); *B65B 11/52* (2013.01); *C11D 1/94* (2013.01); *C11D 3/08* (2013.01); *C11D 3/2044* (2013.01); *C11D 3/2065* (2013.01); *C11D 3/2079* (2013.01); *C11D 3/222* (2013.01); *C11D 3/3753* (2013.01); *C11D 3/50* (2013.01); *C11D 1/123* (2013.01); *C11D 1/143* (2013.01); *C11D 1/662* (2013.01); *C11D 1/72* (2013.01); *C11D 1/90* (2013.01); *C11D 2111/12* (2024.01); *C11D 2111/44* (2024.01)

(58) Field of Classification Search

CPC .. C11D 1/12; C11D 1/14; C11D 1/662; C11D 1/667; C11D 1/72; C11D 1/90; C11D 3/08; C11D 3/2044; C11D 3/2065; C11D 3/22; C11D 3/3753; C11D 3/382; C11D 3/50; C11D 11/00; C11D 11/0064; C11D 11/0082; B65B 5/06; B65B 11/52

See application file for complete search history.

(56) References Cited

U.S. PATENT DOCUMENTS

2015/0218497 A1* 8/2015 Jalbert .................... B29C 41/26
118/68

* cited by examiner

*Primary Examiner* — Brian P Mruk
(74) *Attorney, Agent, or Firm* — Rahman LLC

(57) ABSTRACT

A system, method, and composition for manufacturing sheets of laundry detergent includes purifying water through a purifier that is installed on a tap and collecting the water in a first production tank; preparing polyvinyl alcohol (PVA) in a second production tank; cooling the PVA and then transferring the PVA to a third production tank to prepare the composition for a mixture, then the mixture passes in a fourth production tank which is a mixer to complete the process; pouring a ready dough directly into the mixer where the ready dough is mixed worked until the production process is complete to obtain a mixture; receiving the mixture; pouring the mixture onto a hot belt to create a single flow of detergent that is cooked as the detergent progresses toward an end of a roller; and passing the detergent to a cutting bench where the sheets of laundry detergent are produced.

5 Claims, 11 Drawing Sheets

METHOD AND SYSTEM FOR MANUFACTURING A SHEET OF LAUNDRY DETERGENT

BACKGROUND

Technical Field

The inventive subject matter presented here in is generally directed towards sheets of laundry detergent. More particularly embodiments are related to a system, method, and composition for manufacturing sheets of laundry detergent.

Description of the Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Commonly, different amounts of liquid or powder laundry detergent are measured into cups or other measurement devices before being poured into washing machines.

The usual method of packaging washing powder is to cut the bag during usage, remove a little amount, pack it on the sack holder with the clip, and then add more later. Thus, the sealing of the washing powder package is opened and the washing powder becomes moist, and lumpy, and affect its solvability and cleaning power. Additionally, washing powder is simple to scatter near the washstand while being taken and is challenging to clean.

Further, the washing liquid is generally bottled and requires a measuring cup to measure before use. In addition, the washing liquid bottles have exits that cause washing liquid automatically to overflow owing to repeated push.

Chinese patent application CN103966032A filed by Liu Xueling et. al. discloses an environment-friendly concentrated sheet-shaped neutral detergent. The detergent comprises, by weight, 20% to 55% of fatty acid formic ester sodium sulfonate, 2% to 10% N-fatty acyl amino acid sodium, 1% to 5% of alkyl glycoside, 5% to 10% of layered sodium silicate, 5% to 20% of sodium bicarbonate, 5% to 20% of citric acid, 0.5% to 2% of an efficient sheet-shaped dissociation agent, 0.3% to 1.5% of a bonding excipient, 2% to 5% of octadecyl hydroxyethyl imidazoline and 0.5% to 1.3% of essence. The detergent adopts a neutral formula and thereby does no harm to the skin and causes no damage to textile fibers. Being high in detergency and capable of preventing secondary dirt deposition, the detergent can remove multiple kinds of stains. The detergent, which is free of phosphorus and aluminum and contains neither benzene ring sulphosalt surfactants nor hazardous substances, is good in biological degradability and beneficial for environmental protection. The detergent can be applied to low-temperature washing and washing in different ways and is good in hard water resistance and easy to rinse, such that energy consumption and water consumption can be reduced. The detergent is small in size so packaging costs and transportation costs and the like are reduced. Therefore, the production cost is lowered.

Further, laundry detergent sheets of "Tru Earth" provide biodegradable plastic-free laundry detergent sheets.

U.S. Pat. No. 10,093,890B2 issued to Domingo A. Mesa discloses water soluble packets containing cleaning concentrates in gel form in unit dose, ready-to-use and pouches to be reconstituted in ready-to-use cleaners and fabric treatment products are provided. The packaging system, direct-over-package, and shipping and display package are constructed of biodegradable, compostable, and recyclable components. The packets are stable even though the cleaning formulas for laundry and manual dishwashing contain more than 24% of water by weight. The reconstitution system is comprised of a container and a mixer, manual or powered, specifically designed to prevent foam formation during the reconstitution process while producing a shearing effect to cut the concentrated gels into easy-to-disperse pieces, although various embodiments described herein do not require the use of a mixing device for reconstitution. All components of the system are: biodegradable, compostable, recyclable, or reusable, leading to near-zero waste to the environment.

The existing solutions related to powder, liquid, or sheet of laundry detergent are inconvenient and inefficient, and the consumer's time is wasted by measuring the correct amount of detergent for each load of laundry.

This specification recognizes that there is a need for a system, method, and composition for manufacturing sheets of laundry detergent.

Further limitations and disadvantages of conventional and traditional approaches will become apparent to one of ordinary skill in the art through the comparison of described systems with some aspects of the present disclosure, as set forth in the remainder of the present application and with reference to the drawings.

SUMMARY

A system, method, and composition for manufacturing sheets of laundry detergent are provided and shown in and/or described in connection with the figures.

One aspect of the inventive subject matter relates to a method for producing a composition for making one or more sheets of laundry detergent. The method includes a step of purifying water through a purifier that is installed on a tap. The method includes a step of collecting the water in a first production tank. The method includes a step of preparing polyvinyl alcohol (PVA) in a second production tank. The water passes through a pipe to the second production tank. The method includes a step of cooling the polyvinyl alcohol (PVA) and then transferring the polyvinyl alcohol (PVA) to a third production tank where native corn starch, glycerin, sodium C14-C16 olefin sulfonate, C12-16 Pareth-7, sodium lauryl sulfate, sodium metasilicate pentahydrate, hexylene glycol, dioctyl sodium sulfosuccinate, lauryl glucoside, cocamidopropyl betaine, and potassium sorbate are inserted to prepare the composition for a mixture, then the mixture passes in a fourth production tank which is a mixer to complete the process. The method includes a step of pouring a ready dough directly into the mixer where the ready dough is mixed worked until the production process is complete to obtain a mixture. The method includes a step of receiving, by a production machine, the mixture, wherein the production machine comprises a plurality of pumps to draw the mixture. The method includes a step of pouring the mixture onto a hot belt to create a single flow of detergent that is cooked as the detergent progresses toward an end of a roller. The method includes a step of passing, by the hot belt, the detergent to a cutting bench where the sheets of laundry detergent are produced. The method includes a step of loading the at least one sheet of laundry detergent onto a packaging machine where the sheets of laundry detergent are counted and divided to make a plurality of heat-sealed blisters from a compostable cellulose film. The method includes a step of inserting and closing the heat-sealed blisters in a plurality of cardboard boxes through a packaging machine.

An aspect of the present disclosure relates to a system for manufacturing one or more sheets of laundry detergent. The system includes a purifier, a first production tank, a second production tank, a third production tank, a production machine, a plurality of pumps, a hot belt, a packaging machine, and a plurality of cardboard boxes. The purifier is installed on a tap to purify water. The first production tank to collect the water. The second production tank facilitates a user to prepare polyvinyl alcohol (PVA). The water passes through a pipe to the second production tank to cool down the polyvinyl alcohol (PVA). The third production tank receives the cooled polyvinyl alcohol (PVA), native corn starch, glycerin, sodium C14-C16 olefin sulfonate, C12-16 Pareth-7, sodium lauryl sulfate, sodium metasilicate pentahydrate, hexylene glycol, dioctyl sodium sulfosuccinate, lauryl glucoside, cocamidopropyl betaine, and potassium sorbate to obtain the composition, wherein the third production tank is a mixer that receives a ready dough. The ready dough is mixed in the mixer until the production process is complete to obtain a mixture. The production machine receives the mixture. The production machine comprises a plurality of pumps to draw the mixture. The hot belt receives the mixture to create a single flow of detergent that is cooked as the detergent progresses toward an end of a roller. The hot belt passes the detergent to a cutting bench where the sheets of laundry detergent are produced. The packaging machine receives the at least one sheet of laundry detergent. The packaging machine is configured to count and divide the sheets of laundry detergent to make a plurality of heat-sealed blisters from a cellulose film. The packaging machine inserts and closes the heat-sealed blisters in a plurality of cardboard boxes.

In an aspect, the cellulose film is made of 100% compostable material.

In an aspect, the sheets of laundry detergent are sealed by a heat seal coating to create a moisture barrier.

An aspect of the present disclosure relates to a composition for producing a laundry detergent sheet. The composition includes about 15%-30% native corn starch; about 5-15% glycerin; polyvinyl alcohol (PVA) of about 5-15%; about 5-15% sodium C14-C16 olefin sulfonate; C12-16 Pareth-7 by about 1%-5%; about 1%-5% sodium lauryl sulfate; about 1%-5% sodium metasilicate pentahydrate; about 1%-5% hexylene glycol; about 1%-5% dioctyl sodium sulfosuccinate; about 1%-5% lauryl glucoside; cocamidopropyl betaine of about 1%-5%; and about 1%-5% potassium sorbate.

In an aspect, the composition includes perfume, wherein the perfume comprises Alpha Isomethyl Ionone, Benzyl alcohol, Coumarin, Eugenol, Geraniol, Isoeugenol, Linalool, alpha-Hexylcinnamaldehyde, d-Limonene.

Accordingly, one advantage of the present inventive subject matter is that the production of the sheets of laundry detergent does not have to satisfy particular external temperatures which, without constant maintenance and control, have negative influences on the quality of the product.

Accordingly, one advantage of the present inventive subject matter is that the sheets of laundry detergent are eco-friendly products in all aspects that include ingredients, weight, and size to save transport, save energy in production, no waste, and no water transport.

Accordingly, one advantage of the present inventive subject matter is that the sheets of laundry detergent are protected by a recycled cellulose film which allows us to create completely plastic-free packaging completed by an FSC® cardboard box.

Accordingly, one advantage of the present inventive subject matter is that it provides effective and efficient sheets of laundry detergent in compliance with a green conscience and provides a way to have a large environmental impact.

Accordingly, one advantage of the present inventive subject matter is that its production comes from a formulation composed of eco ingredients and there is no paraben, optical brighteners, bleach, microplastics, MIT preservatives, etc.

Accordingly, one advantage of the present inventive subject matter is that it is a safe product, made with a reduced number of ingredients, which avoids any harmful side effects.

These features and advantages of the present disclosure may be appreciated by reviewing the following description of the present disclosure, along with the accompanying figures wherein like reference numerals refer to like parts.

BRIEF DESCRIPTION OF THE DRAWINGS

The accompanying drawings illustrate the embodiments of compositions, methods, and other aspects of the disclosure. A person with ordinary skills in the art will appreciate that the illustrated element boundaries (e.g., boxes, groups of boxes, or other shapes) in the figures represent an example of the boundaries of such elements. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, where in similar designations denote similar elements, and in which.

DETAILED DESCRIPTION

Figure 1:
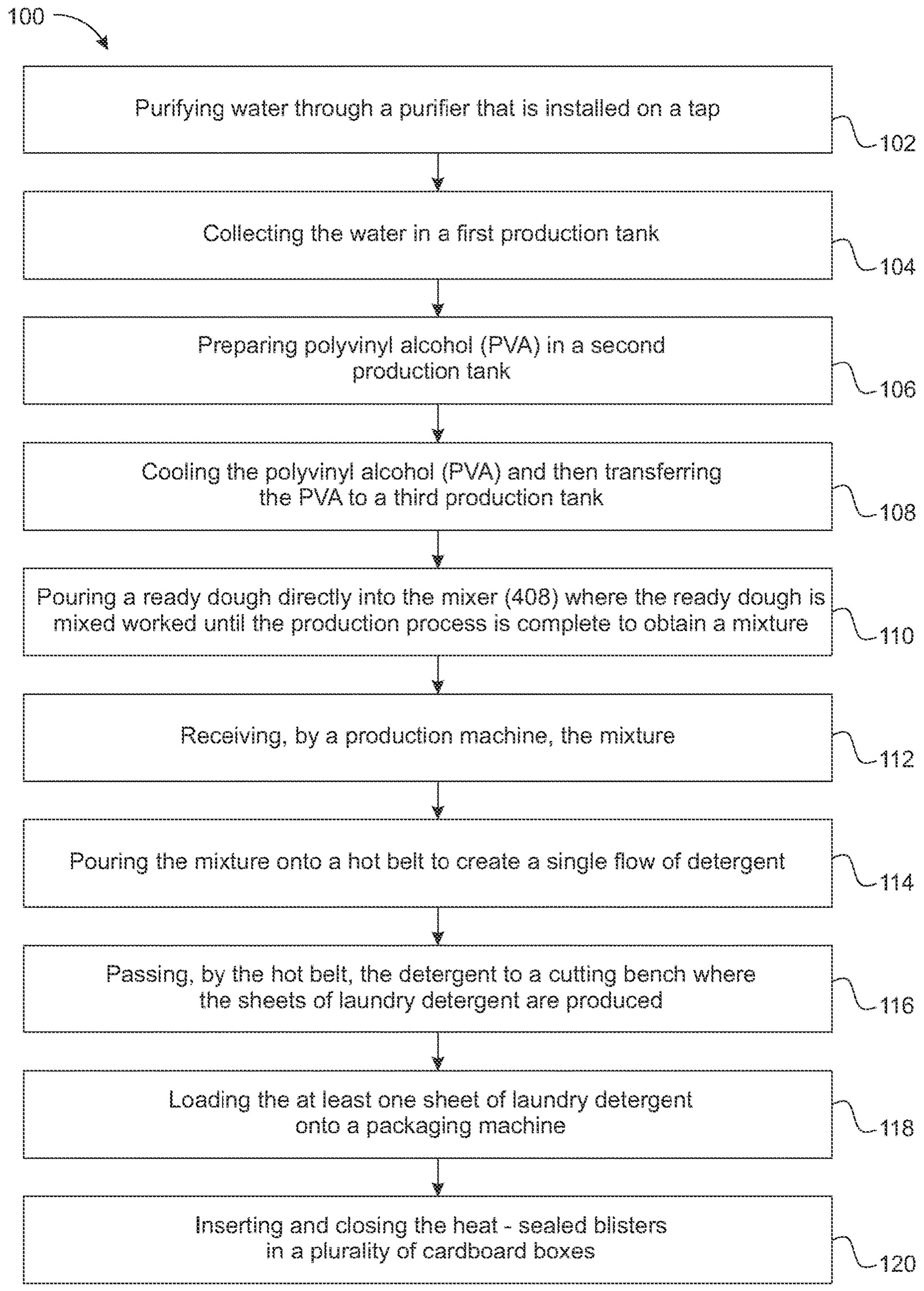
FIG. 1 illustrates a flowchart of a method for producing a composition for making one or more sheets of laundry detergent, in accordance with an embodiment of the present invention.

The present disclosure is best understood with reference to the detailed figures and description set forth herein. Various embodiments of the present systems and methods have been discussed with reference to the figures. However, those skilled in the art will readily appreciate that the detailed description provided herein including the figures are presented for explanatory purposes and the embodiments extend beyond the currently described embodiments. For instance, the teachings and results presented in any particular described application may yield multiple alternative approaches and may be implemented in any suitable manner.

The described embodiments may be implemented manually, automatically, and/or a combination of thereof. The term "method" refers to manners, means, techniques, and procedures for accomplishing any task including, but not limited to, those manners, means, techniques, and procedures either known to the person skilled in the art or readily developed from existing manners, means, techniques and procedures by practitioners of the art to which the embodiments pertains. Persons skilled in the art will envision many other possible variations that are within the scope of the claimed subject matter.

The laundry detergent in sheets is a detergent for washing machines and hand laundry, specifically designed to have a minimum environmental impact and maximum respect for the people who use it by balancing all the aspects that characterize an eco-friendly next-generation product.

The use of laundry detergent in sheets represents taking something small as doing laundry, but finding a way to have a large environmental impact.

Its production comes from a formulation composed of ingredients that respect the environment and interact with each other to give an effective result without ever being aggressive to the environment or people.

Eco-friendly ingredients that excellently replace those commonly used for the production of liquid and powder detergents currently on the market. The detergent in sheets is a safe product, made with a reduced number of ingredients, which are easily controlled in the production phase, both in terms of necessary quantities and for their interactions, thus avoiding any harmful side effects.

Furthermore, compared to liquid detergents, laundry detergent sheets do not transport water and in any case, even in the production phase, a controlled and minimum quantity is used (it is purified water). This means that the laundry detergent in sheets allows a considerable saving of water, the most precious and necessary asset to allow life on our planet.

The uniqueness of laundry detergent sheets lies not only in their formulation but also in the manufacturing process.

Once the mixing of the ingredients has been carried out, which in the last phase is characterized by a state of "vacuum", the production is carried out in a horizontal line by means of a progressive and controlled heating of the mixture. This allows maximum stability of the product, making the standard thickness necessary to guarantee the correct quantity of product.

The product mix is made using a specifically calibrated mixer both in terms of revolutions per minute and pre-set times which also makes this phase unique and valid only for the formulation of the composition for making sheets of laundry detergent.

Therefore, consistently ensuring each resulting sheet of product contains the same quantity of product with a precise standard of efficiency and effectiveness. This translates into the possibility of being able to assure the cleaning performance, which is always linked to other factors such as: water hardness, washing temperatures, state of the laundry, etc.

The drying and solidification phase of the product is performed in a protected system which represents the heart of the production system.

A microclimate is created, with variable temperatures and controlled in successive and consequent phases, which makes the system completely isolated from external temperatures.

This allows the production of the sheets in a context of energy saving, as the production does not have to satisfy particular external temperatures which, without constant maintenance and control, have negative influences on the quality of the product. So, sheets of laundry detergent sheets are produced in a unique energy-saving process.

The production process is followed by a packaging system that makes the sheet different also from the point of view of duration and maintenance of all its characteristics, not least those of an almost unlimited period of washing efficiency.

The sheets of laundry detergent are protected by a recycled cellulose film which allows us to create completely plastic-free packaging completed by an FSC® cardboard box. The protective film is made of compostable material and therefore exceeds the most demanding parameters in terms of controlling the disposal of packaging materials. This cellulose film also has the property of guaranteeing an excellent and long-lasting degree of preservation of the product.

The product inserted in the cellulose film of vegetable origin has a shelf-life of no less than 4 years from the date of production (clearly if the parameters of correct conservation are respected) in which all the characteristics are kept unchanged. Therefore, the correct humidity of the sheet, which makes it not only soft but also easily soluble in a minimum quantity of water during the washing process, the assurance of washing performance, and the complete absence of washing residues, both on fabric and in the washing machine, at the end of the washing cycle.

FIG. 1 illustrates a flowchart 100 of a method for producing a composition for making one or more sheets of laundry detergent, in accordance with an embodiment of the present invention. The method includes a step 102 of purifying water through a purifier that is installed on a tap. The method includes a step 104 of collecting the water in a first production tank. The method includes a step 106 of preparing polyvinyl alcohol (PVA) in a second production tank, wherein the water passes through a pipe to the second production tank. The method includes a step 108 of cooling the polyvinyl alcohol (PVA) and then transferring the polyvinyl alcohol (PVA) to a third production tank where native corn starch, glycerin, sodium C14-C16 olefin sulfonate, C12-16 Pareth-7, sodium lauryl sulfate, sodium metasilicate pentahydrate, hexylene glycol, dioctyl sodium sulfosuccinate, lauryl glucoside, cocamidopropyl betaine, and potassium sorbate are inserted to prepare the composition for a mixture, then the mixture passes in a fourth production tank which is a mixer to complete the process. The method includes a step 110 of pouring a ready dough directly into the mixer where the ready dough is mixed worked until the production process is complete to obtain a mixture. The method includes a step 112 of receiving, by a production machine, the mixture, wherein the production machine comprises a plurality of pumps to draw the mixture. The method includes a step 114 of pouring the mixture onto a hot belt to create a single flow of detergent that is cooked as the detergent progresses toward an end of a roller. The method includes a step 116 of passing, by the hot belt, the detergent to a cutting bench where the sheets of laundry detergent are produced. The method includes a step 118 of loading the at least one sheet of laundry detergent onto a packaging machine where the sheets of laundry detergent are counted and divided to make a plurality of heat-sealed blisters from a compostable cellulose film. The method includes a step 120 of inserting and closing the heat-sealed blisters in a plurality of cardboard boxes through a packaging machine. In an embodiment, the packaging machine has a first part which is the Flow Pack Machine and when the sheets are counted and closed inside the film, then the packs passes in the packaging machine where the packs are closed in the cardboard boxes.

The present disclosure further describes a system for manufacturing one or more sheets of laundry detergent. The system includes a purifier 401, a first production tank 402, a second production tank 404, a third production tank 406, a mixer 408, a production machine 410, a plurality of pumps 412, a hot belt 414, a packaging machine 418, and a plurality of cardboard boxes 420.

Figure 2:
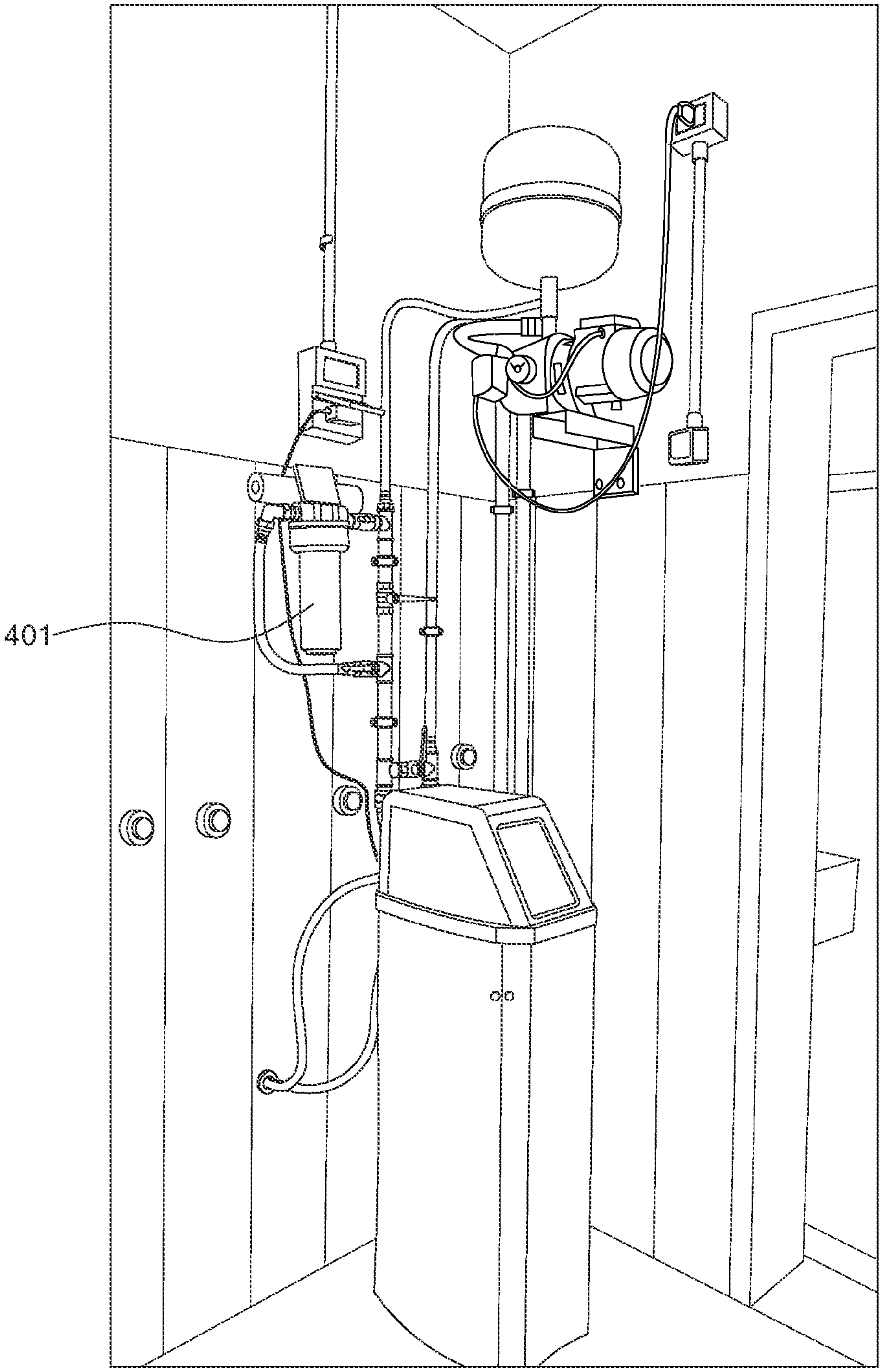
FIG. 2 illustrates a perspective view of a purifier, in accordance with an embodiment of the present invention.
Figure 3:
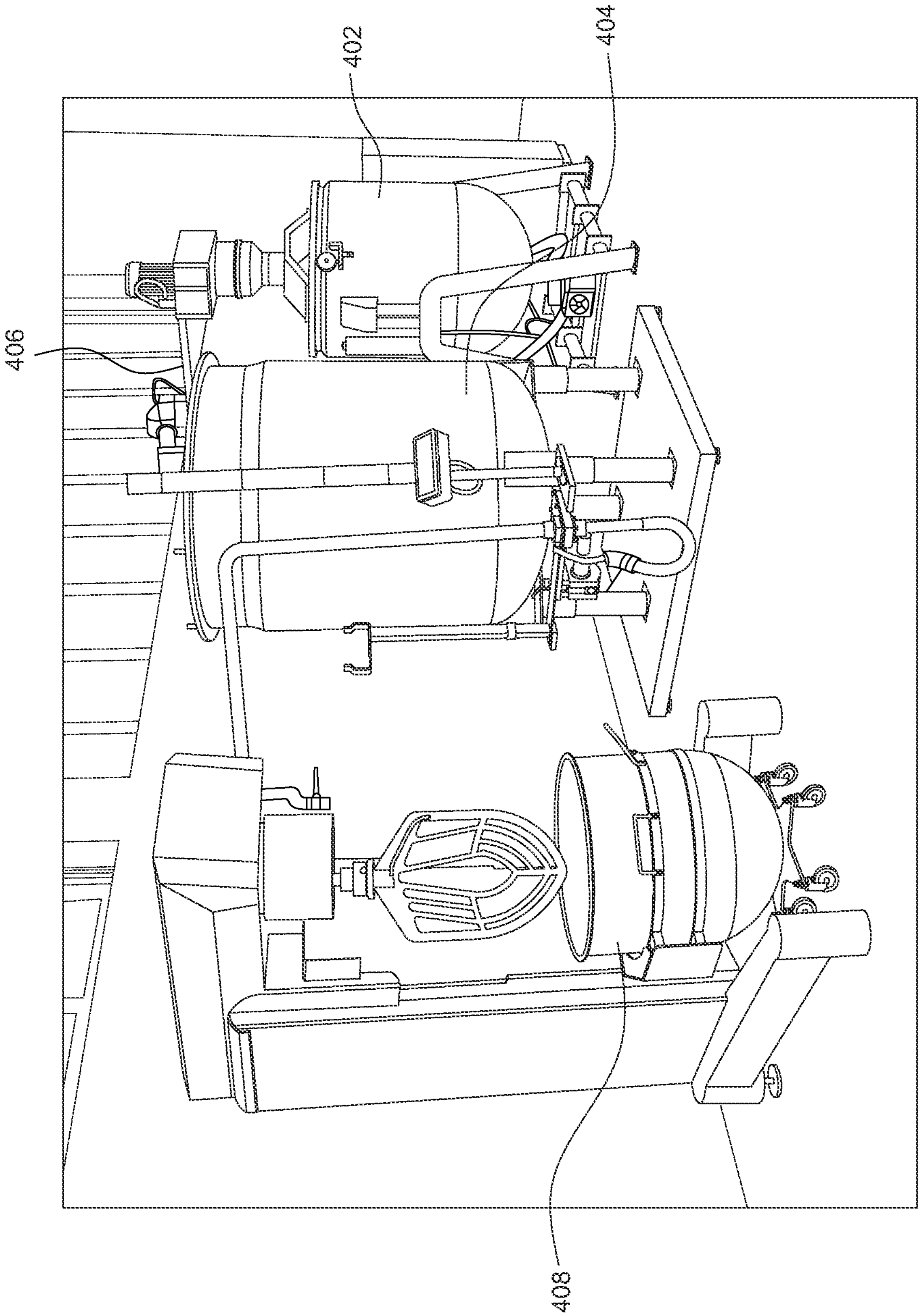
FIG. 3 illustrates a perspective view of a first production tank, a second production tank, a pipe, and a third production tank, in accordance with an embodiment of the present invention.

FIG. 2 illustrates a perspective view of a purifier 401, in accordance with an embodiment of the present invention. The purifier 401 is installed on a tap to purify water. FIG. 3 illustrates a perspective view of: water tank 402, a first production tank 404, a second production tank 406, a pipe 407, and a third production tank 408, in accordance with an embodiment of the present invention. The first tank 402 collects the water. The second tank 404 facilitates a user to prepare polyvinyl alcohol (PVA). The water passes through a pipe to the second production tank 404 to cool down the polyvinyl alcohol (PVA). The third production tank 406 receives the cooled polyvinyl alcohol (PVA), native corn starch, glycerin, sodium C14-C16 olefin sulfonate, C12-16 Pareth-7, sodium lauryl sulfate, sodium metasilicate pentahydrate, hexylene glycol, dioctyl sodium sulfosuccinate, lauryl glucoside, cocamidopropyl betaine, and potassium sorbate to obtain the composition, then passes through a pipe 407 to be mixed in the fourth production tank 408 is a mixer that receives a ready dough. The ready dough is mixed in the mixer 408 until the production process is complete to obtain a mixture.

Figure 4:
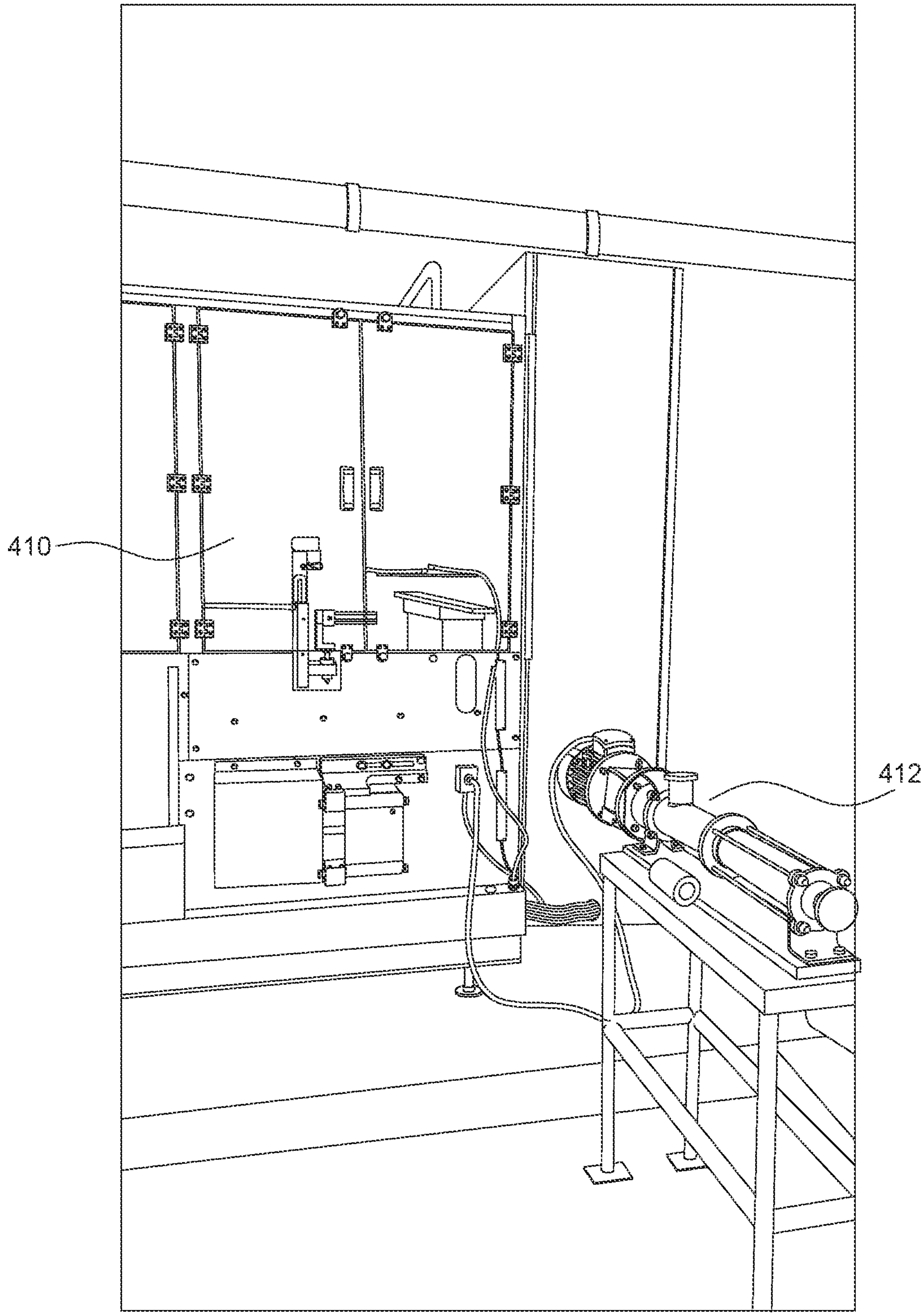
FIG. 4 illustrates a perspective view of a production machine, and a plurality of pumps, in accordance with an embodiment of the present invention.

FIG. 4 illustrates a perspective view of a production machine 410, and the pump with a plurality of taps 412, in accordance with an embodiment of the present invention. The production machine 410 receives the mixture. The production machine 410 comprises a pump with a plurality of taps 412 to draw the mixture.

Figure 5:
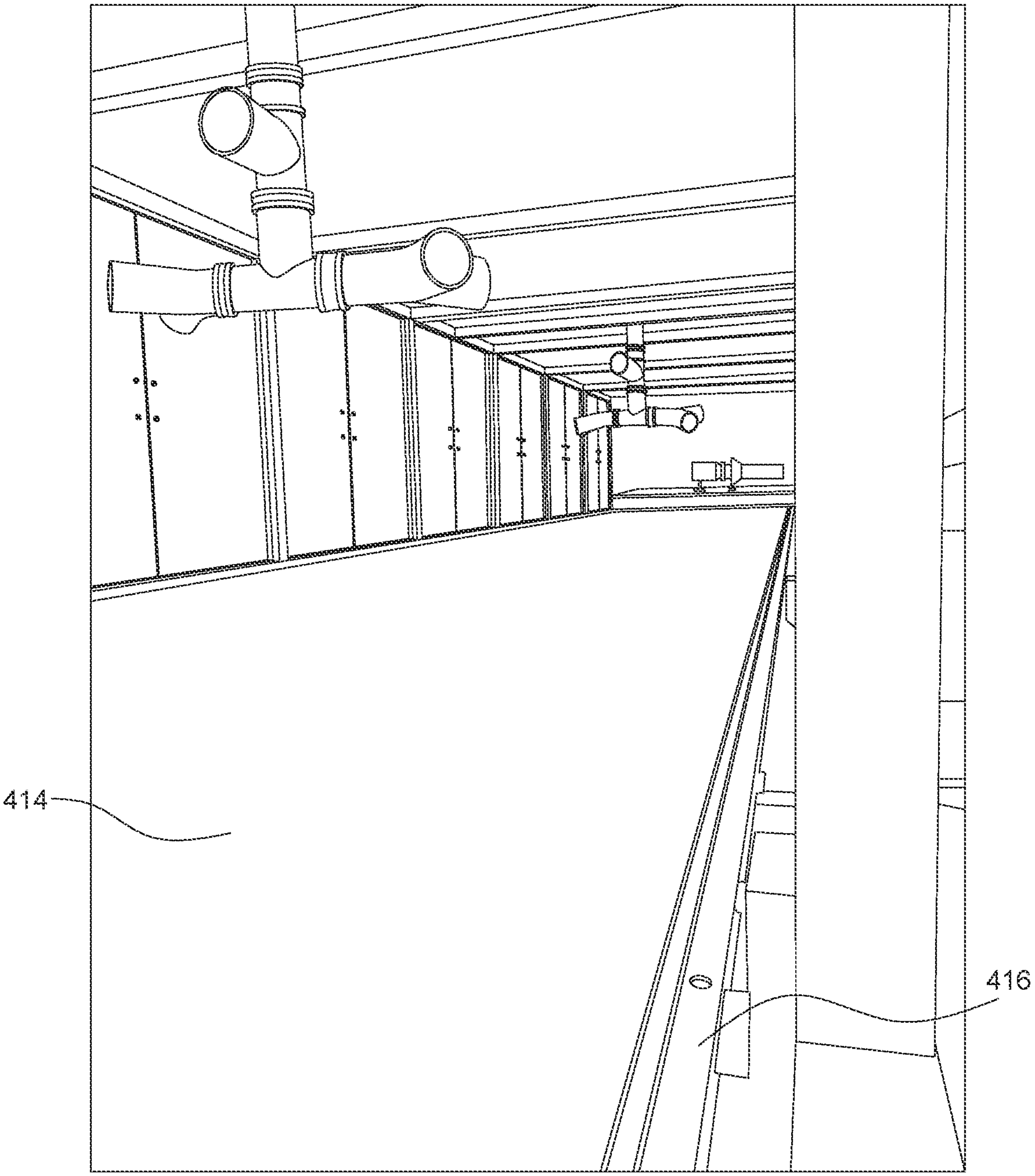
FIG. 5 illustrates a perspective view of a hot belt, and a roller, in accordance with an embodiment of the present invention.

FIG. 5 illustrates a perspective view of a hot belt 414, and a roller 416, in accordance with an embodiment of the present invention. The hot belt 414 receives the mixture to create a single flow of detergent that is cooked as the detergent progresses toward an end of a roller 416. The hot belt 414 passes the detergent to a cutting bench where the sheets of laundry detergent are produced.

Figure 6:
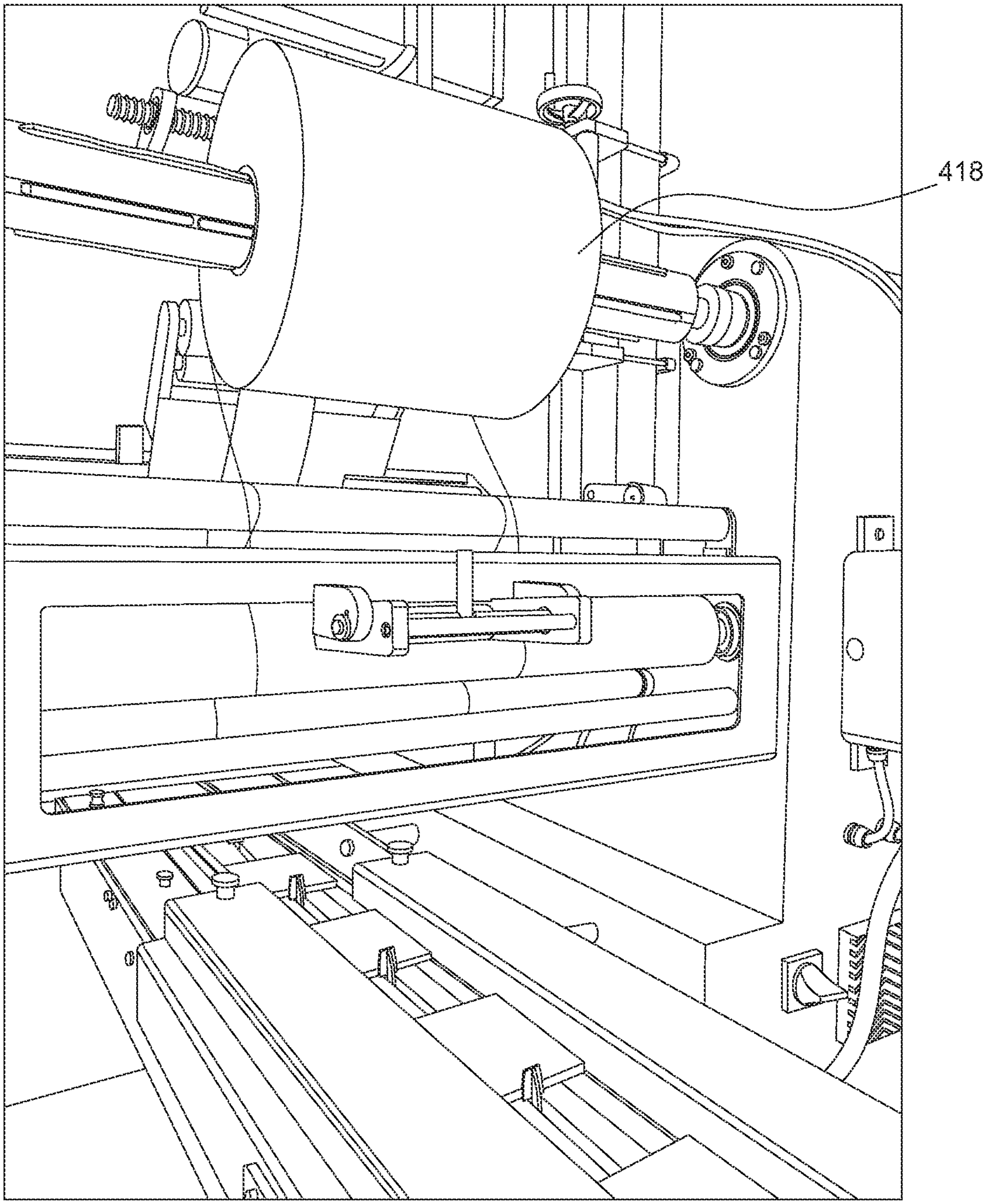
FIG. 6 illustrates a perspective view of a packaging machine and a start of a film machine, in accordance with an embodiment of the present invention.
Figure 7:
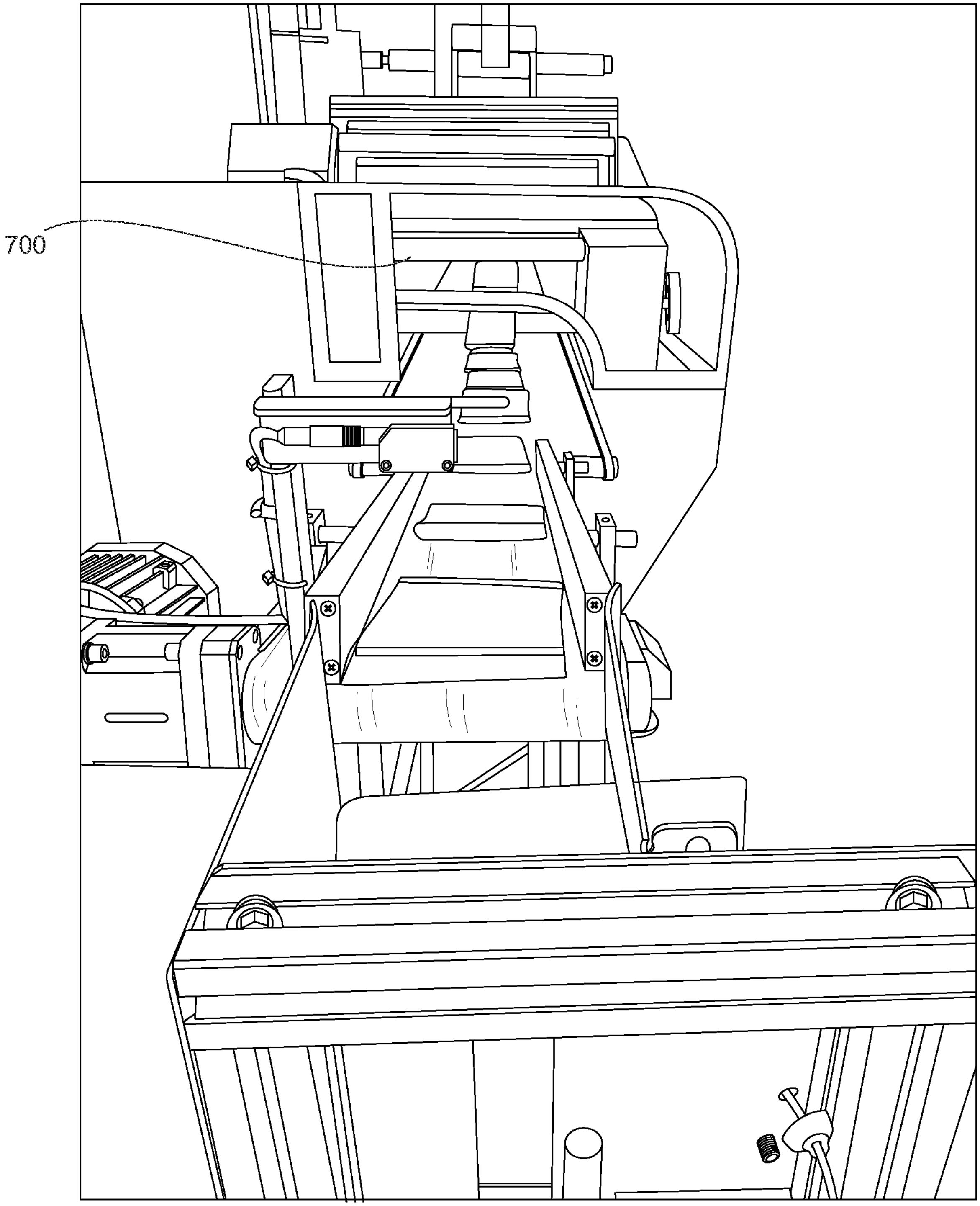
FIG. 7 illustrates a perspective view of an end of the film machine, in accordance with an embodiment of the present invention.
Figure 8:
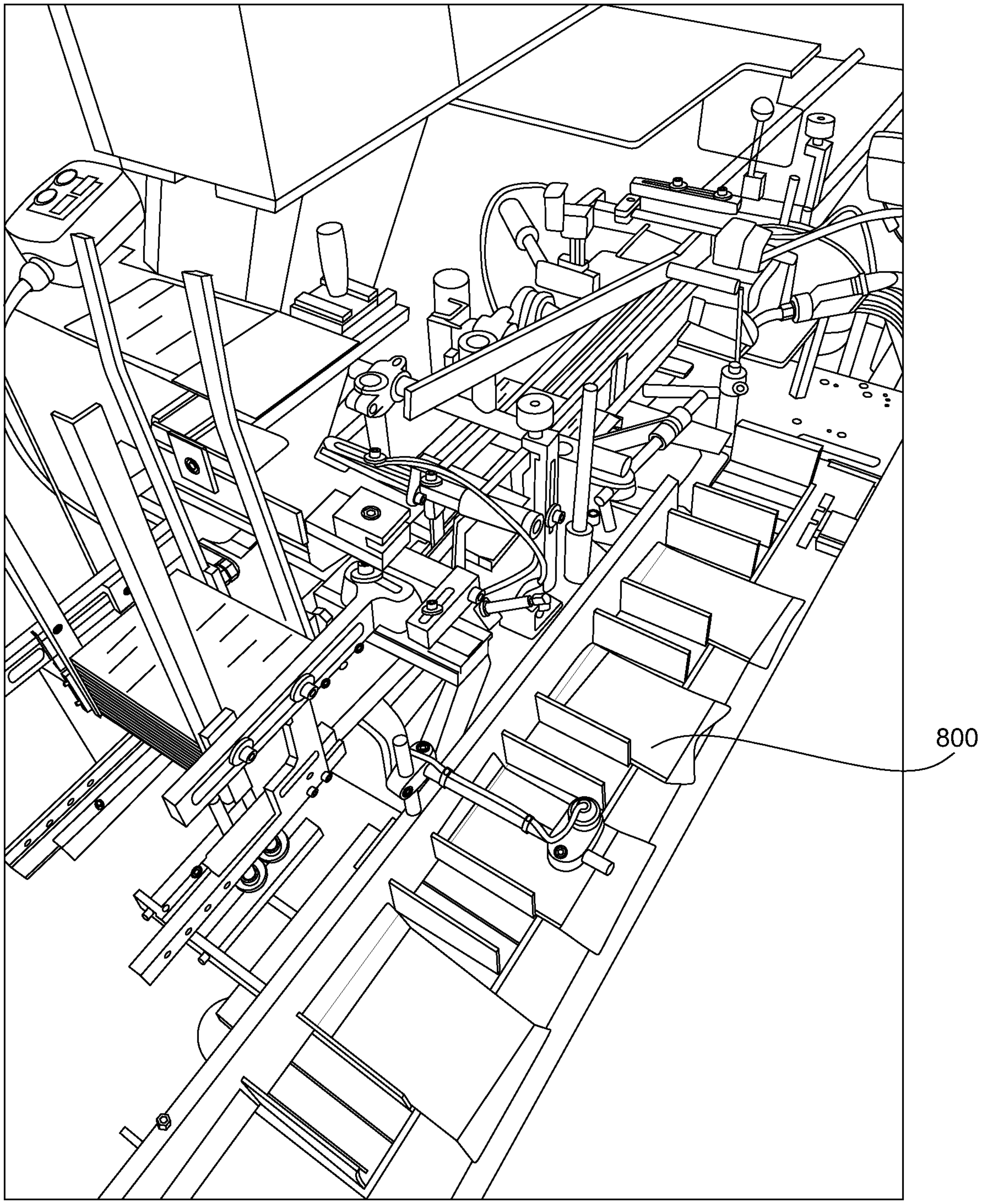
FIG. 8 illustrates a perspective view of a start of a box machine, in accordance with an embodiment of the present invention.

FIG. 6 illustrates a perspective view of a packaging machine 418 and a start of a film machine, in accordance with an embodiment of the present invention. The packaging machine 418 receives the at least one sheet of laundry detergent. The packaging machine is a Flow Pack Machine 418 is configured to count and divide the sheets of laundry detergent to make a plurality of heat-sealed blisters from a cellulose film (shown in FIG. 11). FIG. 7 illustrates a perspective view 700 of an end of the Flow Pack Machine, in accordance with an embodiment of the present invention. The Flow Pack technology is one of the most frequent and commonly used packaging solutions and finds its ideal application in produce, meat, baked goods, and non-food packaging. FIG. 8 illustrates a perspective view 800 of a start of the packaging machine, in accordance with an embodiment of the present invention. Once out of the Flow Pack Machine, the heat-sealed blisters are automatically inserted and closed in the cardboard boxes, where the whole process ends.

Figure 9:
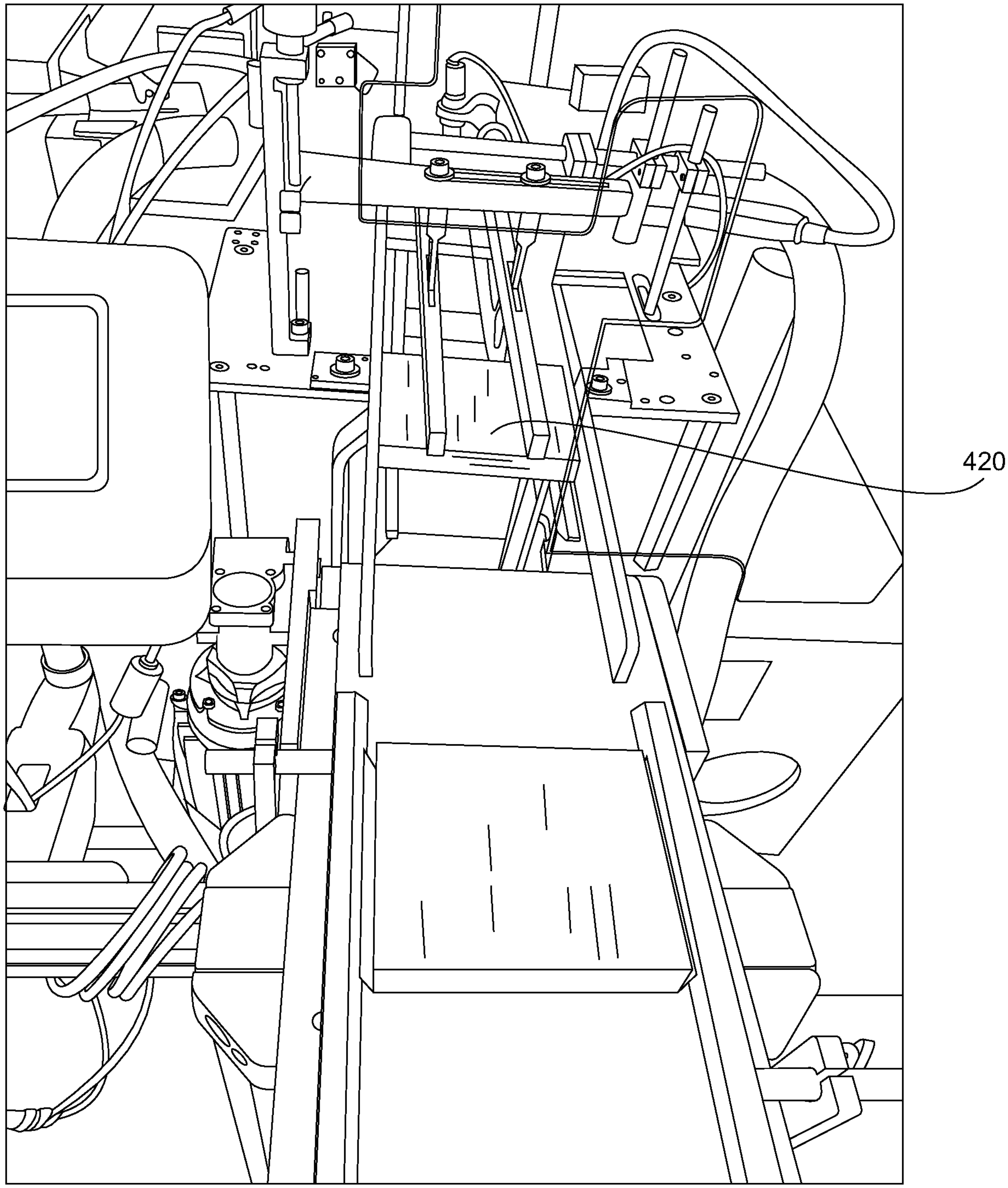
FIG. 9 illustrates a perspective view of a plurality of cardboard boxes and the end of the packaging process, in accordance with an embodiment of the present invention.

The machine inserts and closes the heat-sealed blisters in the plurality of cardboard boxes 420. FIG. 9 illustrates a perspective view of a plurality of cardboard boxes 420 and the end of the packaging process, in accordance with an embodiment of the present invention. In an embodiment, the cellulose film is made of 100% compostable material. In an embodiment, the sheets of laundry detergent are sealed by a heat seal coating to create a moisture barrier.

The present disclosure further describes the composition for producing a laundry detergent sheet. The composition includes about 15%-30% native corn starch; about 5-15% glycerin; polyvinyl alcohol (PVA) of about 5-15%; about 5-15% sodium C14-C16 olefin sulfonate; C12-16 Pareth-7 by about 1%-5%; about 1%-5% sodium lauryl sulfate; about 1%-5% sodium metasilicate pentahydrate; about 1%-5% hexylene glycol; about 1%-5% dioctyl sodium sulfosuccinate; about 1%-5% lauryl glucoside; cocamidopropyl betaine of about 1%-5%; and about 1%-5% potassium sorbate. In an embodiment, the composition includes perfume, wherein the perfume comprises Alpha Isomethyl Ionone, Benzyl alcohol, Coumarin, Eugenol, Geraniol, Isoeugenol, Linalool, alpha-Hexylcinnamaldehyde, d-Limonene.

Figure 10:
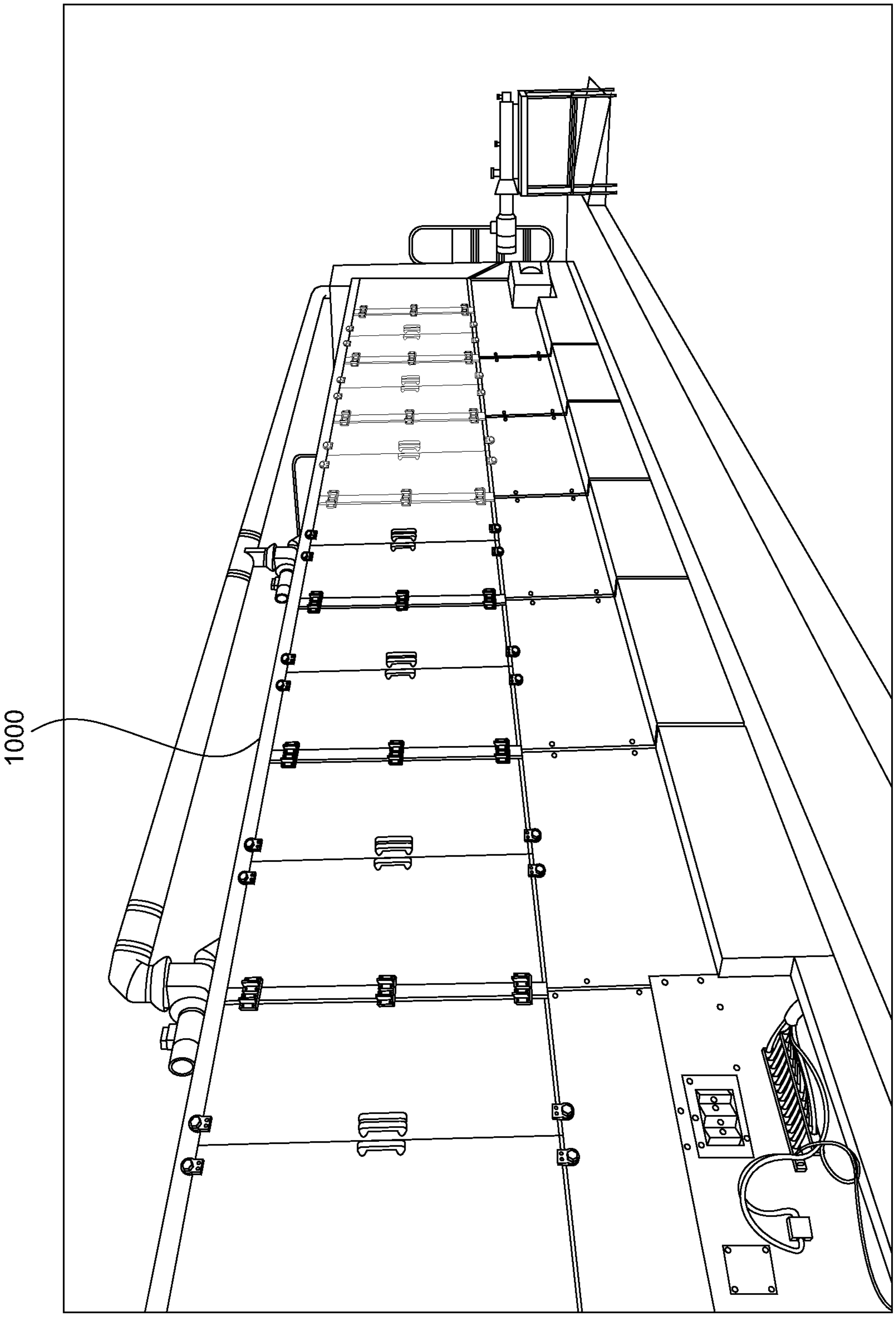
FIG. 10 illustrates a perspective view of a protected system, in accordance with an embodiment of the present invention.

According to an embodiment herein, the present system includes a protected system that is characterized by the production tunnel in which the temperature is constantly kept between $^{80}/_{90}$ degrees Celsius. FIG. 10 illustrates a perspective view of the protected system 1000, in accordance with an embodiment of the present invention. All the processes of the present method occur inside the protected system 1000 which is closed to create a micro-climate. The protected system 1000 is used for drying and solidifying the composition. The protected system 1000 dries the composition to form the sheet (shown in FIG. 11) of laundry detergent. To maintain this constant temperature inside the production tunnel, the protected system constantly receives 30 kW. Temperature consistency is a very important and diversifying aspect of the present apparatus. The production tunnel, closed with respect to the surrounding environment, creates a special microclimate that is not affected or impacted by the external environment, even in the presence of external temperatures according to the seasons. This allows the operators to control and calibrate the apparatus without continuous adjustments and supply controlled energy that makes this apparatus energy efficient. The production process of the sheets is the absence of any influence of the external temperature. In an embodiment, the production tunnel is closed to create a microclimate unaffected by the external environment. In an embodiment, the sheet of laundry detergent is sealed by a heat seal coating which creates a moisture barrier. In an embodiment, the cellulose film is made of 100% compostable material.

Figure 11:
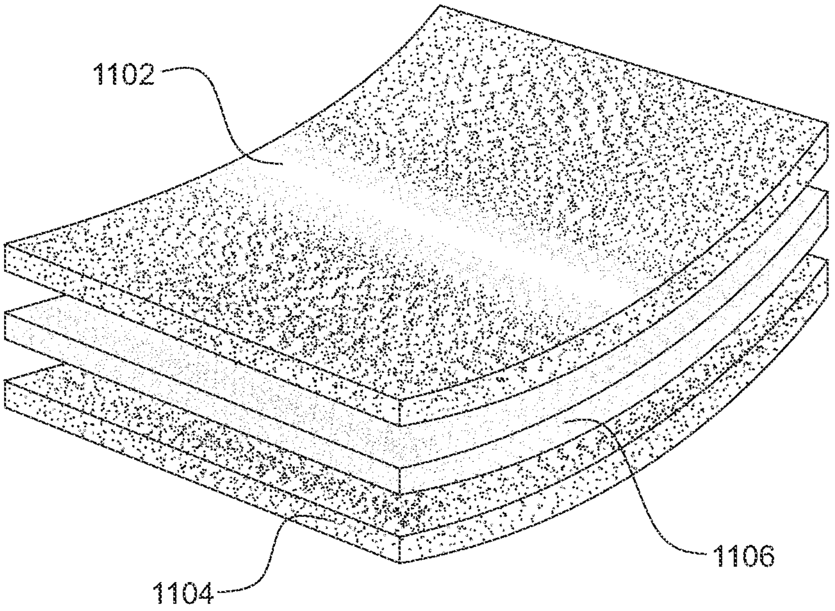
FIG. 11 illustrates a perspective view of a sheet of laundry detergent, and the composition of the compostable film, in accordance with an embodiment of the present invention.

FIG. 11 illustrates a perspective view 1100 of a sheet of laundry detergent, and the composition of the compostable film, in accordance with an embodiment of the present invention. The sheets of laundry detergent are protected by a compostable film that comprises a top layer 1102 and a bottom layer 1104 made of moisture barrier heat-seal coating, and a middle layer 1106 is made of transparent cellulose film. The Futamura film is a recycled and transparent cellulose film to create a completely plastic-free packaging completed by an FSC® cardboard box. To maintain the high quality of sheets of laundry detergent during storage it is recommended that these sheets should be stored in their original wrapping away from any source of local heating or direct sunlight. In the implementation, the cellulose film should be allowed to reach operating room temperatures for 24 hours before use.

Thus, the present system and method for manufacturing the sheets of laundry detergent do not require air-conditioning or force the external temperatures to be regulated, to guarantee the correct and optimal production process. This allows for immense energy savings.

A person skilled in the art will understand that the composition is described herein for illustrative purposes and should not be construed to limit the scope of the disclosure.

A person with ordinary skills in the art will appreciate that the apparatus, method, and composition have been illustrated and explained to serve as examples and should not be considered limiting in any manner. It will be further appreciated that the variants of the above-disclosed system elements, modules, and other features and functions, or alternatives thereof, may be combined to create other different apparatuses, methods, or applications.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for manufacturing one or more sheets of laundry detergent, the method comprising:

purifying water through a purifier that is installed on a tap;

collecting the water in a first production tank;

preparing polyvinyl alcohol (PVA) in a second production tank, wherein the water passes through a pipe to the second production tank;

cooling the polyvinyl alcohol (PVA) and then transferring the polyvinyl alcohol (PVA) to a third production tank where native corn starch, glycerin, sodium C14-C16 olefin sulfonate, C12-16 Pareth-7, sodium lauryl sulfate, sodium metasilicate pentahydrate, hexylene glycol, dioctyl sodium sulfosuccinate, lauryl glucoside, cocamidopropyl betaine, and potassium sorbate are inserted to prepare the composition for a mixture, then the mixture passes in a fourth production tank which is a mixer to complete the process;

pouring a ready dough directly into the mixer where the ready dough is mixed worked until the production process is complete to obtain a mixture;

receiving, by a production machine, the mixture, wherein the production machine comprises a plurality of pumps to draw the mixture;

pouring the mixture onto a hot belt to create a single flow of detergent that is cooked as the detergent progresses towards an end of a roller; and passing, by the hot belt, the detergent to a cutting bench where the sheets of laundry detergent are produced.

2. The method according to claim 1, further comprising loading the at least one sheet of laundry detergent onto a packaging machine where the sheets of laundry detergent are counted and divided to make a plurality of heat-sealed blisters from a compostable cellulose film.

3. The method according to claim 2, further comprising inserting and closing the heat-sealed blisters in a plurality of cardboard boxes.

4. A composition for producing a laundry detergent sheet, the composition comprising:

about 15%-30% native corn starch;

about 5-15% glycerin;

polyvinyl alcohol (PVA) of about 5-15%;

about 5-15% sodium C14-C16 olefin sulfonate;

C12-16 Pareth-7 by about 1%-5%;

about 1%-5% sodium lauryl sulfate;

about 1%-5% sodium metasilicate pentahydrate;

about 1%-5% hexylene glycol;

about 1%-5% dioctyl sodium sulfosuccinate;

about 1%-5% lauryl glucoside;

cocamidopropyl betaine of about 1%-5%; and about 1%-5% potassium sorbate.

5. The composition according to claim 4, further comprising perfume, wherein the perfume comprises Alpha Isomethyl Ionone, Benzyl alcohol, Coumarin, Eugenol, Geraniol, Isoeugenol, Linalool, alpha-Hexylcinnamaldehyde, d-Limonene.

* * * * *